US009274846B2

(12) United States Patent
Radier et al.

(10) Patent No.: US 9,274,846 B2
(45) Date of Patent: Mar. 1, 2016

(54) TECHNIQUE FOR DETERMINING A CHAIN OF INDIVIDUAL FUNCTIONS ASSOCIATED WITH A SERVICE

(75) Inventors: Benoit Radier, Perros Guirec (FR); Mikaël Salaun, Rosnoen (FR); Andreas Klenk, Holzgerlingen (DE); Michael Kleis, Berlin (DE)

(73) Assignee: France Telecom, Paris (FR)

( * ) Notice: Subject to any disclaimer, the term of this patent is extended or adjusted under 35 U.S.C. 154(b) by 1032 days.

(21) Appl. No.: 13/379,906

(22) PCT Filed: Jun. 17, 2010

(86) PCT No.: PCT/FR2010/051211
§ 371 (c)(1),
(2), (4) Date: Dec. 21, 2011

(87) PCT Pub. No.: WO2010/149898
PCT Pub. Date: Dec. 29, 2010

(65) Prior Publication Data
US 2012/0102197 A1      Apr. 26, 2012

(30) Foreign Application Priority Data

Jun. 22, 2009   (FR) ...................................... 09 54216

(51) Int. Cl.
*G06F 9/50*     (2006.01)
*H04L 29/08*    (2006.01)

(52) U.S. Cl.
CPC ............ *G06F 9/5055* (2013.01); *G06F 9/5038* (2013.01); *H04L 67/2809* (2013.01)

(58) Field of Classification Search
CPC . H04L 67/28; H04L 67/2804; H04L 67/2809; G06F 9/5038
See application file for complete search history.

(56) References Cited

U.S. PATENT DOCUMENTS

2011/0093938 A1    4/2011   Asokan et al.

OTHER PUBLICATIONS

International Preliminary Report on Patentability and English translation of the Written Opinion dated Jan. 17, 2012 for corresponding International Application No. PCT/FR2010/051212, filed Jun. 17, 2010.
International Search Report and Written Opinion dated Oct. 13, 2010 for corresponding International Application No. PCT/FR2010/051211, filed Jun. 17, 2010.

(Continued)

*Primary Examiner* — Jerry Dennison
(74) *Attorney, Agent, or Firm* — David D. Brush; Westman Champlin & Koehler, P.A.

(57) ABSTRACT

A method and apparatus are provided for determining a chain of individual functions associated with a service. The functions are designed to be interconnected in order to supply the service to a client entity in a communications network. The method includes the following steps implemented by a determination device: receiving from an access node to the service a temporary chain of individual functions associated with the service requested by the client entity together with a context associated with the client entity; determining an action to be performed on the temporary chain of individual functions associated with the service as a function of the context associated with the client entity; implementing the determined action on the temporary chain in order to obtain a final chain of individual functions; and sending the final chain to the service access node. This method can be implemented for supplying the service to the client entity.

9 Claims, 2 Drawing Sheets

(56) References Cited

OTHER PUBLICATIONS

Chan et al., "MobiPADS: A Reflective Middleware for Contect-Aware Mobile Computing" IEEE Transactions on Software Engineering, IEEE Service Center, Los Alamitos, CA, US, vol. 29, No. 12, Dec. 1, 2003, pp. 1072-1085, XP011107055.

Kleis et al., "CSP, Cooperative Service Provisioning Using Peer-to-Peer Principles" Self Organizing systems, [Lecture notes in computer science], Springer Berlin Heidelberg, Berlin, Heidelberg, vol. 4725, Sep. 11, 2007, pp. 73-87, XP019100161.

International Search Report and Written Opinion dated Oct. 11, 2010 for corresponding International Application No. PCT/FR2010/051212, filed Jun. 17, 2010.

Lavinal et al., "A Next-Generation Service Overlay Architecture" Annals of Telecommunications, vol. 64, No. 3-4, Jan. 16, 2009, pp. 175-185, XP002584144.

Transnexus: "Secure, Multi-Lateral Peering with OpenSER 1.1.1" Jun. 1, 2007, XP002584145 URL:http://www.transnexus.com/White%20Papers/White%20Papers.htm (via Google).

Klenk et al., "Towards Autonomic Service Control in Next Generation Networks" Autonomic and Autonomous Systems, 2008. ICAS 2008. Fourth International Conference on, IEEE, Piscataway, NJ, USA, Mar. 16, 2008, pp. 266-271, XP031242956.

Office Action dated Apr. 5, 2013 from the USPTO for corresponding U.S. Appl. No. 13/380,403, filed Dec. 22, 2011.

Notice of Allowance dated Sep. 5, 2013 from the USPTO for corresponding U.S. Appl. No. 13/380,403, filed Dec. 22, 2011.

Klenk et al., "Secure Stateless Trust Negotiation" N2S Conference 2009.

Klenk et al., "Towards Autonomic Service Control in Next Generation Networks" Fourth International Conference on Autonomic and Autonomous Systems, 2008.

English Translation of the International Preliminary Report on Patentability and Written Opinion dated Jan. 31, 2012 for corresponding International Application No. PCT/FR2010/051211, filed Jun. 17, 2010.

TECHNIQUE FOR DETERMINING A CHAIN OF INDIVIDUAL FUNCTIONS ASSOCIATED WITH A SERVICE

CROSS-REFERENCE TO RELATED APPLICATIONS

This Application is a Section 371 National Stage Application of International Application No. PCT/FR2010/051211, filed Jun. 17, 2010, which is incorporated by reference in its entirety and published as WO 2010/149898 on Dec. 29, 2010, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The disclosure lies in the field of telecommunications, and it relates in particular to a technique for determining a chain of individual functions associated with a service.

BACKGROUND OF THE DISCLOSURE

In a communications network, a plurality of nodes may form an overlay network and thus be connected to one another. By way of example, the overlay network may be of the peer-to-peer type, referred to below as a P2P network. In such an overlay network, the nodes, referred to as "peers", are interchangeable and possess capacities and responsibilities within the network that are equivalent, in contrast to an architecture of the client-server type. Such an overlay network does not rely on its own infrastructure, but on one or more communications networks that are already in place. It makes use of the resources of said underlying network(s) but without necessarily having any knowledge of their physical topology(ies). A communications network is said to underlie the overlay network.

The article entitled "Towards autonomic service control in next generation networks" by A. Klenk et al. and published in the ICAS08 Conference proposes a method of enabling a service to be introduced in autonomic manner in the overlay network. In an initial stage, an operator seeking to offer access to the service and a supplier of the service negotiate a contract prior to receiving a first request to implement the service, with the contract, referred to as a "multimedia transport service agreement", including at least one constraint for implementing the service, e.g. a quality of service constraint. This first stage of negotiation serves to break down a service request into a chain of individual functions. For example, such functions are a video stream transcoding function, an error correction function, a watermarking function, . . . . In a second stage, implemented when a service access request is received from a client entity, nodes having processing modules needed for implementing the individual functions are then determined. Thereafter, depending on the result of this determination, the interconnections that are needed between the processing modules are in turn determined, while taking account firstly of the constraint(s) for implementing the service as specified in the contract and secondly of the costs of implementing the service. During a third stage, the service is supplied to the client entity while using the connections between the processing modules as set up during the second stage.

Once the first negotiation stage has terminated, the chain of individual functions associated with the service is "frozen" and can no longer be modified. Thus, a client entity requesting access to the service runs the risk of being refused because of incompatibility between the client entity's own quality of service constraint and those requested for implementing the service. In order to accommodate client entities presenting different quality of service constraints, it is then necessary to provide a distinct chain of individual functions for each potential quality of service constraint. Furthermore, the client entity may make a mistake when selecting a service corresponding to that entity's own quality of service constraint. The service can then not be supplied.

SUMMARY

In a first aspect, an embodiment of the invention provides a method of determining a chain of individual functions associated with a service, said individual functions being designed to be interconnected in order to provide said service to a client entity in a communications network, said method comprising the following steps implemented by a determination device:
- a step of receiving from an access node to said service a temporary chain of individual functions associated with the service requested by the client entity together with a context associated with the client entity;
- a step of determining an action to be performed on the temporary chain of individual functions associated with the service as a function of the context associated with the client entity;
- a step of implementing the determined action on the temporary chain in order to obtain a final chain of individual functions; and
- a step of sending the final chain to said service access node.

In order to implement the service to the client entity, it is necessary to determine a chain of individual functions. The term "individual functions" is used for example to mean a transcoding function, a metering function, a legal interception function, a watermarking function, . . . . Such an individual function is described by input parameters, a function, and output parameters. The chain of individual functions then represents a string of processes to be implemented starting from a device implementing the service and presenting certain output parameters and going to a client entity presenting certain input parameters. Given that the temporary chain as initially defined during the contract negotiation stage is adapted by the method of an embodiment of the invention to match a context associated with the client entity, only one stage of negotiation is needed between the communications network supplier and the service supplier. The client entity then no longer needs itself to select a service identifier that is adapted to the entity's own needs. Adaptation to those needs is performed in autonomic manner within the network. This serves to limit any risk of error on the part of the client entity. The administration of various services is also simplified, since only one negotiation stage takes place. It is thus possible to provide each client entity with access to the service that has been matched to the client entity in autonomic manner.

According to a particular characteristic, this action to be performed belongs to the group comprising at least: a deletion; an addition; a replacement.

During adaptation, it may be necessary to add an individual function to the temporary chain. For example, if the capacity of the client entity is not compatible with a video service, it is possible to add a transcoding function into the temporary chain. During the second stage, a communications network element offering the transcoding function is then selected and participates in supplying the service to the client entity during the third stage of implementing the service.

The adaptation may also involve deleting an individual function from the temporary chain. For example, a metering function may be provided in the temporary chain but may be found to be unnecessary for the client entity when its access is of the ADSL type or when said access takes place during a first utilization period.

The adaptation may also consist in modifying an individual function of the temporary chain. For example, a transcoding function may initially be provided but it may need to be modified as a function of the time access is made to the service.

According to another particular characteristic, the context associated with the client entity belongs to the group comprising at least: an identifier of the user of the client entity; a type of network access; a type of terminal.

The identifier of the user may be taken into account, e.g. for the purpose of inserting a legal interception function into the temporary chain.

The type of the access network may be obtained by interrogating a network access session or connectivity session location and repository function (CLF) server. The information stored by that server can thus be used for adapting the chain of individual functions.

The type of terminal may be sent in the service access request. It is then possible to adapt the chain of individual functions as a function of the intrinsic characteristics of the terminal.

According to another particular characteristic, the method further includes a step of verifying whether said client entity is authorized to access said service, the step of implementing the determined action being executed when the client entity is authorized to access the service.

Since access authorization is verified before the step of performing the determined action, the method may be stopped when the client entity is not authorized to access the service. This avoids postponing the decision to after resources have already been reserved in the network.

According to another particular characteristic, the method also includes a step of obtaining at least one rule relating to the context associated with the client entity, and in which the action to be performed on the temporary chain is also determined as a function of said rule.

It is possible to store rules in a database, the rules relating to contexts that are associated with the client entity. By way of example, these may be rules for applying to different client entities, rules that depend on the operator of the communications network, rules that depend on the service. Thus, the determination device interrogates the database in order to obtain the rules that are to be applied for the context that is associated with the client entity.

In a second aspect, an embodiment of the invention provides a determination device for determining a chain of individual functions associated with a service, said individual functions being designed to be interconnected in order to supply said messages to a client entity in a communications network, said device comprising:

receiver means for receiving from an access node to said service a temporary chain of individual functions associated with the service requested by the client entity, together with a context associated with the client entity;

determination means for determining an action to be performed on the temporary chain of individual functions associated with the service, as a function of the context associated with the client entity;

implementation means for implementing the determined action on the temporary chain in order to obtain a final chain of individual functions; and sender means for sending the final chain to said service access node.

In a third aspect, an embodiment of the invention provides a service access node comprising:

receiver means for receiving from a client entity a service access request, said request including a context associated with the client entity;

obtaining means for obtaining a temporary chain of individual functions associated with said service;

sender means for sending to a device for determining a chain of individual functions a temporary chain of individual functions associated with the service together with a context associated with the client entity; and receiver means for receiving from said device a final chain of individual functions.

In a fourth aspect, an embodiment of the invention provides a system for processing a service access request made by a client entity, the system comprising at least one service access node and a determination device for determining a chain of individual functions associated with a service, as described above.

In a fifth aspect, an embodiment of the invention provides a computer program including instructions for implementing the method as described above for determining a chain of individual functions associated with a service by means of a determination device when the program is executed by a processor.

BRIEF DESCRIPTION OF THE DRAWINGS

The disclosure can be better understood from the following description of a particular implementation of the method, given with reference to the accompanying drawings, in which.

DETAILED DESCRIPTION OF ILLUSTRATIVE EMBODIMENTS

Figure 1:
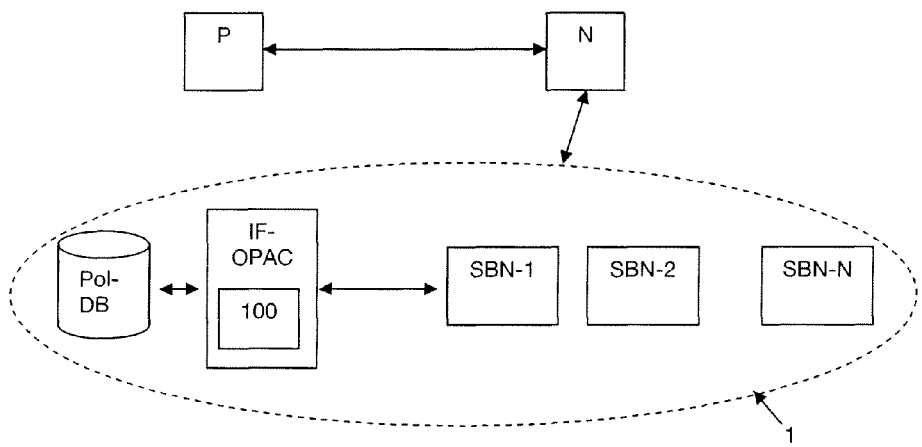
FIG. 1 shows a system for processing a request for access to a service in its environment, in a particular implementation of the invention.

A system 1 for processing a request for access to a service in a communications network is shown diagrammatically in FIG. 1. The system 1 comprises a plurality of access nodes to that service referenced SBN-1, . . . , SBN-N for "service bootstrap node". A terminal N is also shown in FIG. 1. Below, the term "client entity" is used to designate the terminal N or the user U of the terminal N. In an embodiment of the invention, the system 1 also includes an access control entity referenced IF-OPAC for "interface overlay proxy access control", which entity is administered by the operator giving access to the service. This access control entity IF-OPAC comprises in particular a device 100 for determining a chain of individual functions. The access control entity IF-OPAC is arranged to interrogate a database Pol-DB that stores rules relating to the client entities, rules associated with the operator of the communications network, and rules associated with the service. These rules may be stored in a single database or they may be stored in distinct databases. A rule relating to the client entity may for example be adding an individual function conditionally, depending on an access type. A rule relating to the service serves to specify conditions for access to the service, in particular who is authorized to access the service, when can the service be accessed, from where can the services be accessed, which users are authorized. A rule associated with the operator of the communications network serves to specify conditions for accessing the resources of the network. By way of example, this may involve a maximum authorized data rate in the communications network that differs depending on the user, or on a time of access to the service. Still as non-limiting examples, access to the resources of the communications network may be available only to users of the network, the access network used by the client entity does not accept roaming client entities, the resources available for roaming users are limited to certain data rates in the down direction or in the up direction after implementing an authorization procedure, whereas non-roaming users are not limited, . . . .

A portal P is also shown and, for a given service S, it stores a service identifier SID and addresses of access nodes to the service SBN.

In order to enable the client entity to access the service S, a chain of individual functions TSID needs to be determined. According to the article entitled "Towards autonomic service control in next generation networks" by A. Klenk et al. and published in the ICAS08 Conference, such a chain of individual functions is defined during the stage of negotiation between the service supplier and the telecommunications network supplier. At the end of the negotiation stage, the service is defined by:
   a unique service identifier SID;
   a set of individual data-processing functions $P_{SID}$; and
   a set of constraints associated with the service $C_{SID}$. These constraints comprise parameters associated with the service and authorizations for access to the service. By way of example, the parameters associated with the service are the place of access, the time of access, the manner of access, and quality of service parameters, such as a maximum acceptable cost, a maximum acceptable delay, a required passband, . . . . The constraints may also be specified between the elements of the processing chain.

This information that as a whole defines the service identified by the service identifier SID is referred to below as a processing chain template. It comprises an ordered chain of individual functions $P_i$.

An individual data-processing function is represented in the form of a triplet (I, P, O) where I represents the input format that the processing function P can process, and O represents the output format that results from implementing the processing function P. When any input format is acceptable, this is represented by the character "*".

By way of example, an individual function $P_i$ is a legal interception, a localization function, a watermarking function, a transcoding function, a cache function, a network address translation (NAT) function, a deep packet inspection (DPI) function, a presence function, a bridge-conference function. This list is naturally not exhaustive. Below, this chain of individual functions is written as follows:

$$(I_{MS}, O_{MS}) \sim (I, P_1, O) \sim (I, P_2, O) \sim \ldots (*, P_i, O) \sim (I_{MC}, O_{MC})$$

where MS represents the service and MC represents the client entity.

Figure 2:
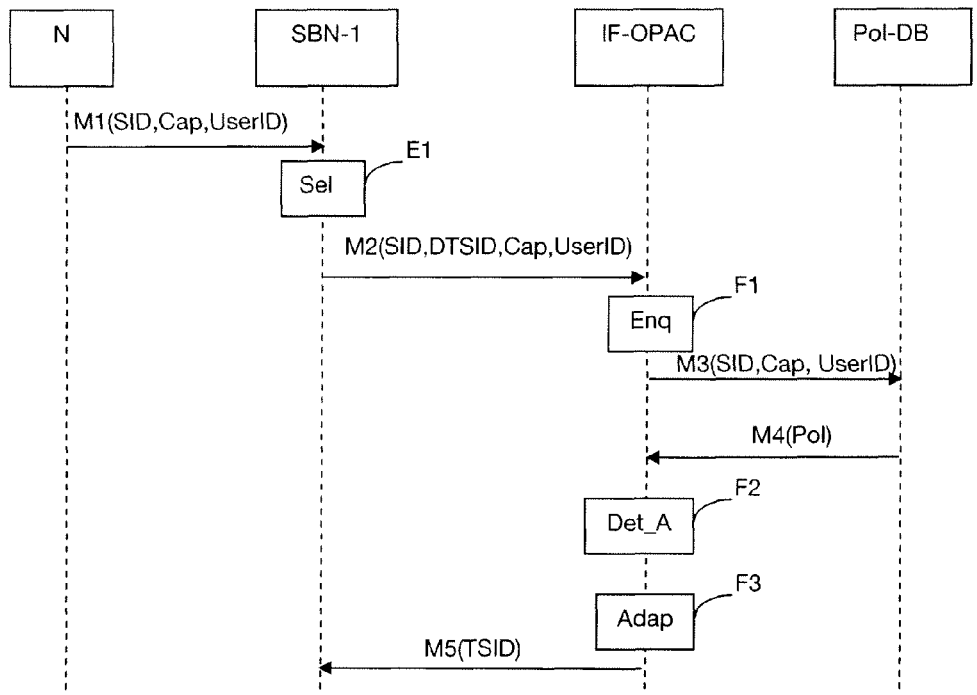
FIG. 2 shows the steps of the method of the invention in a particular implementation.

There follows a description of the process for determining a chain of individual functions in a particular implementation, given with reference to FIG. 2.

A prior negotiation stage is implemented between the operator seeking to offer access to the service and the service supplier S, and this leads to defining a temporary processing chain template, referred to below as a temporary chain.

The client entity N seeking access to a service S initially contacts the portal P in order to obtain the service identifier SID and the addresses of access nodes SBN to the service. Thereafter, the client entity N selects an access node SBN-1 to the service and sends a request M1 to access the service S to said selected access node. This access request M1 (SID, Cap, UserID) comprises an identifier of the service SID, the capacities Cap of the client entity, and an identifier UserID of the user of the client entity.

The access request M1 is received by the service access node SBN-1 in a step E1 of the method. Still in this step E1, the service access node SBN-1 obtains a chain of individual functions associated with the service. According to an embodiment of the invention, this chain is a temporary chain, written DTSID, and it is determined between the network supplier and the service supplier during the negotiation stage. The access node SBN-1 then sends a message M2 to the access control entity IF-OPAC. The message M2 (SID, DTSID, Cap, UserID) contains the elements of the message M1 together with the temporary chain of individual functions.

The message M2 is received by the access control entity IF-OPAC in a step F1. The access control entity IF-OPAC then sends a request M3 to the database Pol-DB, which request comprises a service identifier SID and a context associated with the client entity. A context associated with the client entity may, for example, be an identifier of the user of the client entity, user ID, and the capacities of the client entity. The context may equally well be a type of access network, obtained by interrogating a network access session server or CLF. Such a server serves to collect information about user sessions at access-network level. In particular it stores an association between an address of the terminal and geographical location information of the corresponding network, together with characteristics about the access (up rate, down rate, physical characteristics of the line). A response M4 is received from the rule database Pol-DB, containing at least a rule relating to the client entity. The response M4 may also include rules associated with the communications network operator, and rules associated with the service.

In a step F2 of determining actions to be performed on the temporary chain, the access control entity IF-OPAC begins by verifying that the client entity N is authorized to access the service. If the client entity is not authorized to access the service, then the service access request is rejected. This rejection is transmitted to the access node SBN-1 which then notifies the client entity.

Verifying authorization to access the service in this way thus enables unauthorized client entities to be rejected at once, instead of waiting for the service to be put into operation. This serves to economize the resources of the overlay network, and thus of the underlying communications network.

If the client entity is authorized to access the service, still during this step F2 of the method, the access control entity IF-OPAC determines one or more actions to be performed on the temporary chain as a function of rules relating to the context associated with the client entity.

The actions that may be performed on the temporary chain of individual functions DTSID may be the following, for example:
  adding an individual function after some other individual function;
  deleting an individual function;
  replacing an individual function;
  adding an individual function to the end of the chain; and
  adding an individual function to the beginning of the chain.

At the end of this step F2 of the method, the service access control entity IF-OPAC may thus determine that:
  access to the service for said client entity is not authorized, e.g. because of a context associated with the client that is not compatible with the service;
  access to the service for said client entity is authorized without modifying the temporary chain; or
  access to the service for said client entity is authorized but with the temporary chain being modified as a function of one or more actions to be performed that are determined during this step F2.

If one or more actions to be performed have been determined, then during a step F3 of implementing this or these actions, the access control entity IF-OPAC implements the action(s) to be performed on the temporary chain in order to obtain a final chain of individual functions. The chain of individual functions is thus adapted as a function of the context associated with the client entity. Thus, the client entity N can obtain the requested service, even if the constraints on that client were not initially compatible with the constraints of the service. This also avoids providing a plurality of individual function chains, with each of those chains being associated with a given client entity profile. Failures associated with poor selection by the client entity are thus avoided. The service adapts in autonomous manner as a function of the context associated with the client entity.

If no action is determined, then the temporary chain becomes the final chain.

In all events, still during this step F3, the access control entity IF-OPAC sends a response message M5 to the service access node SBN-1, the message including the final chain of individual functions for implementing in the overlay network in order to provide the service to the client entity.

These steps F2 and F3 may be performed by using a language specification such as extensible access control markup language (XACML). Such a specification defines a language for controlling access, for interchanging rules, and for administering the security policy of information systems. It is possible to generate internally an authorization request for each element of the temporary chain and to obtain in return an authorization response comprising one or more actions to be performed that are determined as a function of the rules obtained from the database Pol-DB. These response messages are then processed during the step F3. Optionally, it is also possible to use such a language specification to certify the information sent by the client entity or obtained by a third-party supplier entity and make the transactions secure, as described in the article "Secure stateless trust negotiation" by A. Klenk et al., published in the 2009 N2S Conference.

Once the final chain of individual functions has been determined, steps such as those described in the above-mentioned article are then performed by the service access node SBN in order to search in the overlay network for nodes that propose the required individual functions and such that the connections between the various nodes make it possible to comply with the constraints associated with the chain of individual functions.

As an illustrative example, there follows a description of the implementation of a video service using such a method. It should be understood that the method is not restricted to this example.

The stage of negotiation between the communications network supplier and the supplier of a high definition video service has led to a temporary chain of individual functions being registered in the service access node SBN-1. The published service makes available a film F presenting the following characteristics: audio/video codec H.264, resolution high definition (HD), video passband 7 megabits per second (Mb/s), audio passband 256 kilobits per second (kb/s), delay 500 milliseconds (ms). These characteristics are associated with a profile referenced 200. A client entity "alice@orange.fr" transmits an access request to the service, including its own characteristics. By way of example, these may be: audio/video codec MPEG-4, resolution quarter common intermediate format (QCIF), video passband 200 kb/s, audio passband 56 kb/s, delay 500 ms. These characteristics are associated with a profile referenced 3000.

The service access node SBN-1 then sends a request M2 comprising the following temporary chain of individual functions (alice@orange.fr, 3000)~(200, F).

The access control entity IF-OPAC then verifies in step F2 that the client entity N is indeed authorized to access the service, and then determines that a transcoding function TC needs to be added in the temporary chain. At the end of the step F3, the final chain is then (alice@orange.fr, 3000)~(3000, TC, 200)~(200, F).

It should thus be observed that there is no need to negotiate a service supply contract for each possible user profile. A single negotiation stage suffices, the temporary chain at the end of the negotiation then being adapted as a function of the context associated with the client entity.

It is emphasized at this point that the temporary chain for a client entity of profile 200 is directly the final chain.

Figure 3:
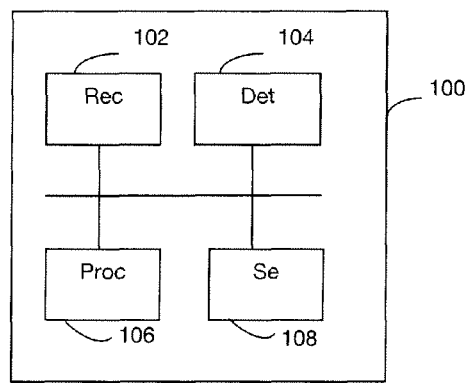
FIG. 3 shows a device for determining a chain of individual functions associated with a service in a particular embodiment of the invention.

A device 100 for determining an individual function chain associated with a service is described below with reference to FIG. 3.

Such a device 100 comprises:
  a receiver module 102 for receiving from a service access node a temporary chain of individual functions associated with the service requested by a client entity and a context associated with the client entity;
  a determination module 104 for determining an action to be performed on the temporary chain as a function of the context associated with the client entity;
  an implementation module 106 for implementing the determined action on the temporary chain in order to obtain a final chain; and
  a sender module 108 for sending the final chain to the service access node.

The module 104 is also arranged to interrogate the database Pol-BD for a context associated with the client entity and to receive in return at least one rule relating to that context.

The device 100 for determining a chain of individual functions is designed to be incorporated in the access control entity IF-OPAC.

Figure 4:
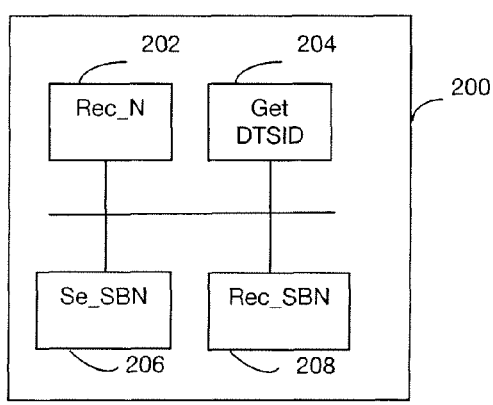
FIG. 4 shows a service access node in a particular embodiment of the invention.

A service access node SBN-1, SBN-N, 200 as shown in FIG. 4 comprises:
  a receiver module 202 for receiving from a client entity a request to access the service, said request including a context associated with the client entity;

an obtaining module 204 for obtaining a temporary chain of individual functions associated with said service;

a sender module 206 for sending to a device for determining a chain of individual functions a temporary chain together with a context associated with the client entity; and a receiver module 208 for receiving from said device a final chain of individual functions.

The modules 202, 204, 206, and 208 are arranged to implement the above-described method of determining a chain of individual functions. It preferably comprises software modules including software instructions for executing the steps of the above-described determination method when implemented by the device for determining a chain of individual functions. An embodiment of the invention thus also provides:

a program for a device for determining a chain of individual functions, the program including program code instructions for controlling the execution of the steps of the above-described determination method when said program is executed by said device; and a recording medium readable by a device for determining a chain of individual functions and having recorded thereon the program for a device.

The software modules may be stored in or transmitted by a data medium. The medium may be hardware storage medium such as, for example a compact disk read only memory (CD-ROM), a magnetic floppy disk, or a hard disk, or indeed a transmission medium such as an electrical, optical, or radio signal, or a telecommunications network.

An embodiment of the invention also provides the system 1 for processing a request for access to a service made by a client entity N, the system comprising at least one service access node SBN-1, SBN-N, 200 and a device IF-OPAC, 100 for determining a chain of individual functions associated with a service, as described above.

Although the present disclosure has been described with reference to one or more examples, workers skilled in the art will recognize that changes may be made in form and detail without departing from the scope of the disclosure and/or the appended claims.

The invention claimed is:

1. A method of determining a chain of individual functions associated with a service, said individual functions being designed to be interconnected in order to provide said service to a client entity in a communications network, said method comprising the following acts:
   a client entity sending an access request to an access node to said service;
   in response to receiving the access request, the access node sending to a determination device a temporary chain of individual functions associated with the service requested by the client entity together with a context associated with the client entity; and
   the following acts implemented by the determination device:
   determining an action to be performed on the temporary chain of individual functions associated with the service as a function of the context associated with the client entity, wherein the context associated with the client entity belongs to the group comprising at least one of an identifier of the user of the client entity, a type of network access or a type of terminal;
   implementing the determined action on the temporary chain in order to obtain a final chain of individual functions; and
   sending the final chain to said access node to said service.

2. The method according to claim 1, wherein said action to be performed belongs to the group comprising at least: a deletion; an addition; a replacement.

3. The method according to claim 1, including verifying whether said client entity is authorized to access said service, and wherein implementing the determined action is executed when the client entity is authorized to access the service.

4. The method according to claim 1, further including obtaining at least one rule relating to the context associated with the client entity, and in which the action to be performed on the temporary chain is also determined as a function of said rule.

5. A determination device for determining a chain of individual functions associated with a service, said individual functions being designed to be interconnected in order to supply said messages to a client entity in a communications network, said device comprising:
   receiver means for receiving, from an access node to said service, an access request of the client entity to said service and a temporary chain of individual functions supplied by the access node and associated with the service requested by the client entity, together with a context associated with the client entity;
   determination means for determining an action to be performed on the temporary chain of individual functions associated with the service, as a function of the context associated with the client entity, wherein the context associated with the client entity belongs to the group comprising at least one of an identifier of the user of the client entity, a type of network access or a type of terminal;
   implementation means for implementing the determined action on the temporary chain in order to obtain a final chain of individual functions; and
   sender means for sending the final chain to said access node.

6. A service access node comprising:
   receiver means for receiving from a client entity a service access request, said request including a context associated with the client entity, wherein the context associated with the client entity belongs to the group comprising at least one of an identifier of the user of the client entity, a type of network access or a type of terminal;
   obtaining means for, in response to receiving the service access request from the client entity, obtaining a temporary chain of individual functions associated with said service;
   sender means for sending to a device, for determining a chain of individual functions, said service access request and said temporary chain of individual functions together with a context associated with the client entity; and
   receiver means for receiving from said device a final chain of individual functions.

7. A system for processing a service access request made by a client entity, the system comprising:
   at least one service access node comprising:
      receiver means for receiving from a client entity a service access request, said request including a context associated with the client entity, wherein the context associated with the client entity belongs to the group comprising at least one of an identifier of the user of the client entity, a type of network access or a type of terminal;

obtaining means for, in response to receiving the service access request from the client entity, obtaining a temporary chain of individual functions associated with said service;

sender means for sending a temporary chain of individual functions together with a context associated with the client entity; and receiver means for receiving a final chain of individual functions; and a determination device comprising:

receiver means for receiving from said service access node the temporary chain of individual functions associated with the service access request, together with the context associated with the client entity;

determination means for determining an action to be performed on the temporary chain of individual functions associated with the service access request, as a function of the context associated with the client entity;

implementation means for implementing the determined action on the temporary chain in order to obtain the final chain of individual functions; and sender means for sending the final chain to said service access node.

8. A system according to claim 7 for processing an access request, the system further including a database storing at least rules relating to context associated with client entities.

9. A non-transitory hardware storage medium comprising a computer program stored thereon and including instructions for implementing a method for determining a chain of individual functions associated with a service by means of a determination device when the program is executed by a processor, said individual functions being designed to be interconnected in order to provide said service to a client entity in a communications network, wherein the method comprises:

receiving from an access node to said service an access request of the client entity to said service and a temporary chain of individual functions supplied by the access node and associated with the service requested by the client entity, together with a context associated with the client entity;

determining an action to be performed on the temporary chain of individual functions associated with the service as a function of the context associated with the client entity, wherein the context associated with the client entity belongs to the group comprising at least one of an identifier of the user of the client entity, a type of network access or a type of terminal;

implementing the determined action on the temporary chain in order to obtain a final chain of individual functions; and sending the final chain to said access node to said service.

* * * * *